United States Patent [19]

Smith

[11] 3,892,423
[45] July 1, 1975

[54] TRAILER

[76] Inventor: Marjorieann M. Smith, 3825 Valley Blvd. No. 59, Walnut, Calif. 91789

[22] Filed: Oct. 29, 1973

[21] Appl. No.: 410,536

[52] U.S. Cl.......... 280/106 T; 280/423 B; 214/505
[51] Int. Cl............................................. B60p 1/28
[58] Field of Search......... 280/106 R, 106 T, 423 B, 280/425 A; 214/505, 506

[56] References Cited
UNITED STATES PATENTS
3,698,740 10/1972 Chisholm ........................ 280/423 B
3,724,695 4/1973 Taylor................................ 214/505

Primary Examiner—Philip Goodman
Assistant Examiner—John A. Carroll
Attorney, Agent, or Firm—Boniard I. Brown

[57] ABSTRACT

A trailer to be towed by a pickup truck or the like having a rear cargo space mounting a fifth wheel coupling and adapted primarily for transporting vehicles, such as racing cars. The trailer has a frame with a rear, relatively low cargo bed for supporting a vehicle to be transported, a front elevated hitch tongue for pivotal connection to the fifth wheel coupling of the pickup truck. The longitudinal members of the frame are bent to a unique S-shape or gooseneck shape and have curved front extremities joined to one another in such a way as to minimize stress concentrations in the members and provide a relatively strong and rigid frame.

3 Claims, 5 Drawing Figures

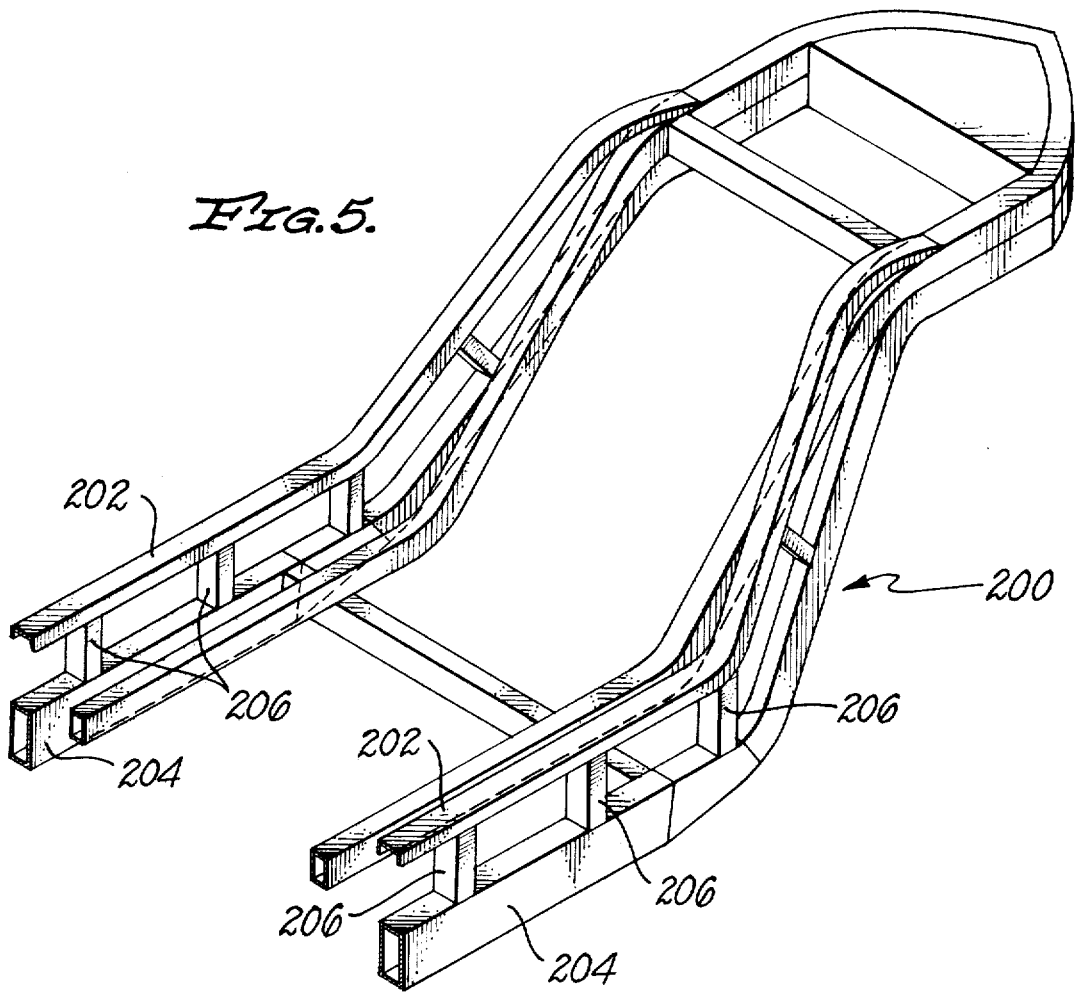

TRAILER

BACKGROUND OF THE INVENTION

1. Field of the Invention

This invention relates generally to trailers to be towed by a towing vehicle and more particularly to a novel trailer to be towed by a pickup truck or the like having a rear cargo space mounting a fifth wheel coupling.

2. Prior Art

A relatively recent innovation in the trailer towing art involves the use of a pickup truck as a towing vehicle. To this end, a so-called fifth wheel coupling is mounted on the floor of the rear cargo space of the pickup truck for pivotal connection to the hitch tongue of a trailer.

Trailers designed to be towed by such a fifth-wheel-coupling-equipped pickup truck are required to have an elevated hitch tongue which extends over the rear drop gate of the truck and mounts a coupling member for pivotal connection to the truck's fifth wheel coupling. The rear bed portions of the trailer frame, on the other hand, is generally located at a substantially lower elevation than the tongue. As a consequence, the longitudinal members of the frame must extend from the lower elevation of the trailer bed to the higher elevation of the hitch tongue, thus creating problems of bending stress and stress concentrations in the trailer frame.

Trailers with this general frame configuration are disclosed in U.S. Pat. Nos. 2,115,248; 2,389,211; 2,622,891.

SUMMARY OF THE INVENTION

This invention provides an improved trailer of the class described having a unique frame construction which greatly alleviates these problems of bending stress and stress concentration. To this end, the trailer frame has longitudinal frame members with rear parallel end portions which extend along the sides of the trailer bed, elevated front end portions which are located above the level of the rear portions and converge inwardly toward and join one another on the longitudinal centerline of the frame to form a trailer hitch tongue, and intermediate portions which extend between and join the front and rear portions. The junctures of these intermediate portions of the frame members with their front and rear end portions are curved to increase bending strength and reduce stress concentrations at the junctures, such that the longitudinal frame members, when viewed in side elevation, have a generally S-shape or gooseneck shape. Preferably, though not necessarily, the intermediate portions of the frame members slope forwardly in the direction of their upper ends.

As will appear from the ensuing description, the trailer of the invention may be designed to transport various kinds of loads. The particular trailers described are intended to transport vehicles, particularly racing cars and have various additional features, such as reinforcing frame members and rub rails, which uniquely adapt the trailers to this purpose.

BRIEF DESCRIPTION OF THE DRAWINGS

FIG. 5 is an enlarged fragmentary perspective view of a further modified trailer.

DESCRIPTION OF THE PREFERRED EMBODIMENT

Figure 1:
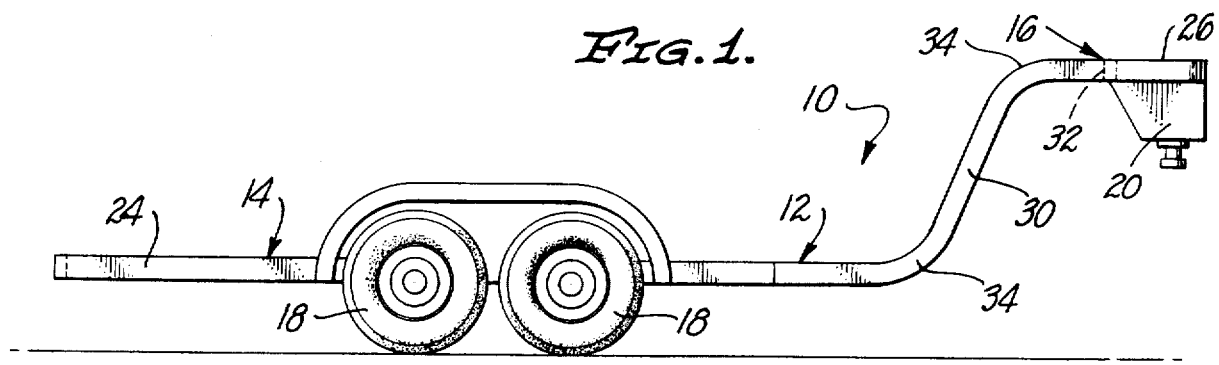
FIG. 1 is a side elevation of a trailer according to the invention.
Figure 2:
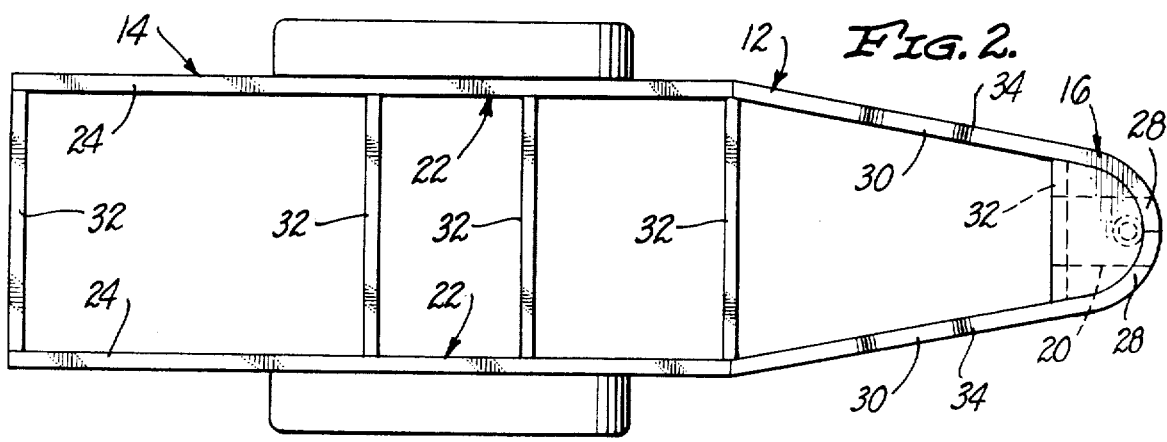
FIG. 2 is a top plan view of the trailer in FIG. 1.

The trailer 10 illustrated in FIGS. 1 and 2 has a frame 12 with a rear normally generally horizontal cargo bed 14 and a front normally generally horizontal hitch tongue 16 located above the level of the bed. As viewed in side elevation in FIG. 1, the frame has a generally S-shape or gooseneck shape which characterizes the frame. Mounted on the frame at opposite sides of the bed 14 are ground wheels 18 which are preferably located above midway between the ends of the bed. Mounted at the underside of the hitch tongue 16 adjacent its front extremity is a coupling member 20 for pivotal connection to the fifth wheel coupling mounted on the floor of the rear cargo space of a pickup truck, not shown.

As noted earlier, the trailer may be designed to transport various types of loads. The particular trailers illustrated are intended primarily for transporting vehicles, particularly racing cars. For this particular use, the trailers will be equipped with tracks or channels for receiving the vehicle wheels. These tracks form no part of the invention, however, and have been omitted for the sake of clarity.

Referring in more detail to the drawings, the trailer frame 12 includes longitudinal frame members 22 having generally parallel and normally generally horizontal rear end portions 24 extending along the sides of the frame bed 14, front end portions 26 located at a level above the level of the bed and extending forwardly in converging relation to and joined to one another at their front extremities 28 on the longitudinal centerline of the frame, and intermediate portions 30 extending between and joining the front and rear portions. These intermediate portions of the frame members converge inwardly in the forward direction from the relatively wide spacing of the rear end portions 24 of the members to the narrower spacing of the front end portions 26 of the members, as shown in FIG. 2 and preferably slope forwardly in the upward direction, as shown in FIG. 1. The longitudinal frame members 22 are joined at intervals by cross frame members 32. Frame members 22, 32 preferably comprise closed box channels.

According to an important feature of the invention, the junctures 34 of the intermediate portions 30 of the longitudinal frame members 22 with their front and rear portions 24, 26 are curved, as shown best in FIG. 2. These curved junctures provide the frame 12 with its S-shape or gooseneck shape, and both improve the bending strength of the frame and alleviate bending stress at the junctures. The curved front extremities 28 of the frame members 22 alleviate bend stress at the front end of the tongue 16 and provide with the adjacent cross member 32 a strong and rigid support for the coupling member 20. As a consequence, the trailer possesses relatively great rigidity and strength and is thus uniquely adapted for use as a vehicle transport trailer to be towed by a pickup truck with a fifth wheel coupling.

Figure 3:
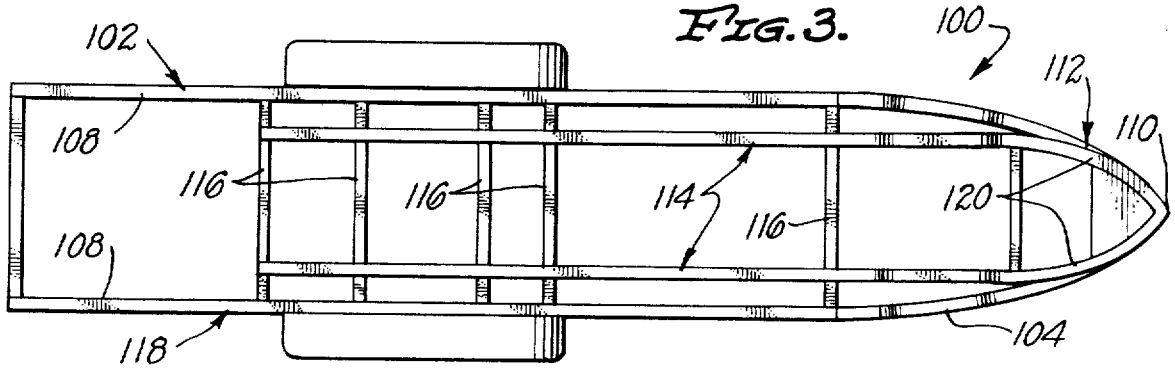
FIG. 3 is a top plan view of a modified trailer.
Figure 4:
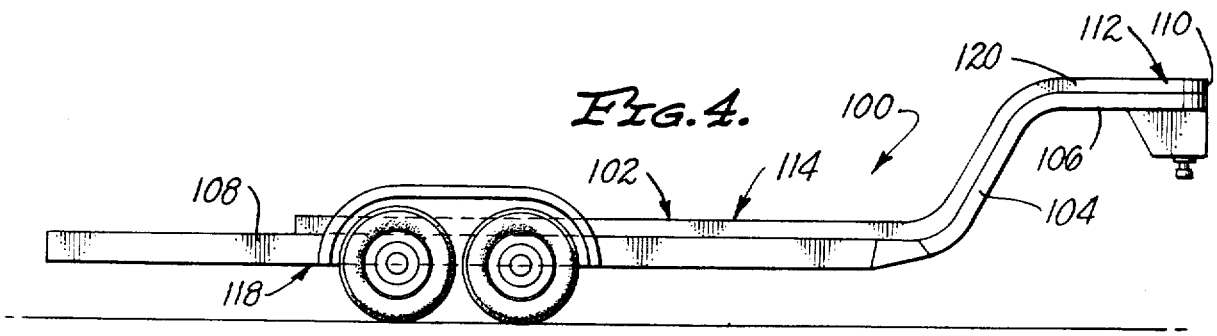
FIG. 4 is a side elevation of the trailer in FIG. 3.

The modified trailer 100 of FIGS. 3 and 4 has a basic frame structure 102 much like that of FIGS. 1 and 2 except that the intermediate and front end portions 104, 106 of the main longitudinal frame members 108 are curved over their entire length, and the front extremity 110 of the frame hitch tongue 112 is somewhat pointed, as shown in FIG. 3.

A feature of the trailer 100 resides in reinforcing longitudinal frame members 114. These reinforcing frame members overlie and are firmly joined to the frame cross members 116, inwardly of the main longitudinal frame members 108. The reinforcing frame members extend forwardly along the rear frame bed 118 and then upwardly to and forwardly along the hitch tongue 112. As may be readily observed in the drawings, the front ends 120 of the reinforcing frame members curve inwardly toward the longitudinal centerline of the frame and overlie the front extremity 110 of the hitch tongue 112. These front ends of the reinforcing members are firmly joined to one another and to the front extremity of the hitch tongue, thus reinforcing the basic frame structure 102.

The further modified trailer frame 200 shown in FIG. 5 is identical to that of FIGS. 3 and 4 except for its inclusion of rub rails 202. These rub rails are channels which extend along and above the main longitudinal frame members 204 and are joined at intervals to the latter members by risers 206. The rub rails provide additional reinforcement for the trailer frame and provide lateral retaining members for a vehicle supported on the trailer.

The invention claimed is:

1. A trailer to be towed by a pickup truck or the like having a rear cargo space mounting a fifth wheel coupling, comprising:

a frame having a rear normally generally horizontal cargo bed and a front normally generally horizontal hitch tongue located above the level of said cargo bed, said frame including main longitudinal frame members having generally parallel and normally generally horizontal rear end portions along the sides of said cargo bed and opposite end portions which curve upwardly and inwardly toward one another and then forwardly and inwardly toward one another and are joined at their front extremities to form said hitch tongue, and cross frame members joining said longitudinal frame members, ground wheels mounted on said frame at opposite sides of said cargo bed, and a coupling member mounted on the underside of said hitch tongue adjacent its front end for pivotal connection to said fifth wheel coupling.

2. A trailer according to claim 1 wherein:

said frame includes additional reinforcing longitudinal frame members secured to the upper sides of said cross frame members inwardly of said main longitudinal frame members and extending forwardly along said cargo bed and then upwardly to the level of and forwardly along said hitch tongue and having converging front extremities overlying the front extremities of said main longitudinal frame members and joined to one another and to the front extremities of said main longitudinal frame members.

3. A trailer according to claim 1 wherein:

said frame includes rub rails above and extending along said main longitudinal frame members and spaced risers joining said main longitudinal frame members and risers at intervals therealong.

* * * * *